United States Patent Office 3,340,279
Patented Sept. 5, 1967

3,340,279
7α-METHYL-STEROIDS OF THE OESTRANE SERIES
Hendrik Paul de Jongh and Nicolaas Pieter van Vliet, Oss, Netherlands, assignors to Organon Inc., West Orange, N.J., a corporation of New Jersey
No Drawing. Filed June 1, 1965, Ser. No. 460,476
Claims priority, application Netherlands, June 16, 1964, 64—6,797
3 Claims. (Cl. 260—397.4)

ABSTRACT OF THE DISCLOSURE

7α-methyl-steroids of the oestrane series, which contain a keto group at the 3-position, and which may be substituted at the 17-position by lower alkyl, alkenyl or alkynyl, and their esters of inorganic acids and of organic acids containing from 1 to 18 carbon atoms, such as, for example, $\Delta^{5(10)}$ - 3 - keto-7α-methyl-17β-hydroxy-17α-ethinylestrene, are valuable hormones possessing both androgenic and anabolic activity.

---

The invention relates to novel 7α-methyl-steroids of the oestrane series and to a process for the preparation thereof.
More particularly, it relates to the preparation of a new group of compounds having the formula:

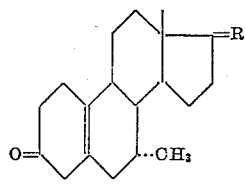

wherein
R=a keto group, or the group OX (αY), in which X is hydrogen, or an acyl group, and Y is hydrogen or a lower alkyl, alkenyl, or alkynyl group.
These compounds are prepared by starting from a compound of the formula:

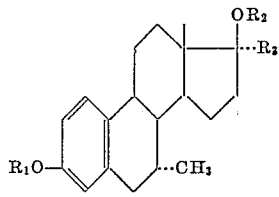

in which
$R_1$=a hydrocarbon radical,
$R_2$=hydrogen, or an acyl group, and
$R_3$=hydrogen, a lower alkyl or lower alkenyl group, reducing these compounds by a method known per se to the corresponding $\Delta^{2,5(10)}$ - 3-alkoxy-7α-methyl-17β-hydroxyoestradiene compound, which may possibly be substituted still by a lower alkyl or alkenyl group, after which the 3-enol-ether group is hydrolysed by treatment with an acid under mild conditions for the preparation of the desired $\Delta^{5(10)}$-3-keto-7α-methyl compound, in which, either before or after hydrolysis of the 3-enol-ether group, the substituents indicated in 17-position can be introduced, if desired.
If the 17-alkylation takes place after hydrolysis of the 3-enol-ether group, the 3-keto group must be temporarily protected, for instance by ketalization in a conventional manner, such as by reaction of the $\Delta^{5(10)}$-3-keto-steroid with an aliphatic alcohol and a weak acid. Another possibility is to prepare the 3-thioketal by reaction of the 3-enol-ether compound with an alcohol.
The starting products may already have a lower alkyl or alkenyl group in 17-position, but it is also possible to introduce these groups at a later stage.
The 3-ether group is usually a lower aliphatic hydrocarbon radical, preferably a methyl group.
The reduction of the aromatic compound to the corresponding $\Delta^{2,5(10)}$-3-alkoxy compound is performed by treating the former steroid with an alkali metal in liquid ammonia and an alcohol. For preference lithium is used.
The thus obtained $\Delta^{2,5(10)}$-3-alkoxy-oestradiene compound is next converted into the corresponding $\Delta^{5(10)}$-3-keto-compound by treatment with an acid under mild conditions.
For this hydrolysis oxalic acid is usually applied together with an aqueous alcohol, for instance methanol, for 20–60 minutes, but other weak organic acids, too, such as acetic acid, propionic acid or butyric acid, can be used. As in the reduction of the aromatic ring A a possibly present 17-keto, or 17-alkynyl group is reduced simultaneously, and a 17-ester group is split off reductively, the starting product is preferably a 17β-hydroxy-steroid, or a 17β-hydroxy-17-alkyl, or 17-alkenyl-steroid.
After reduction, or possibly, at a later stage, after hydrolysis of the 3-enol-ether group, the 17β-hydroxy group can be esterified, and/or a 17-alkynyl group introduced by oxidation of the 17β-hydroxy compound, followed by an alkynylation reaction, if desired, followed by esterification of the obtained 17β-hydroxy-17α-alkynyl compound.
Instead of starting from a 17α-alkyl, or 17α-alkenyl compound it is naturally also possible to introduce these groups at a later stage. Then a 17β-hydroxy-steroid is taken as starting material, after which the $\Delta^{2,5(10)}$-3-alkoxy-7α-methyl-17β-hydroxy-steroid obtained as intermediate product, or the $\Delta^{5(10)}$-3-keto-7α-methyl-17β-hydroxy compound obtained after hydrolysis of this compound, is oxidized and next submitted in the usual manner to a 17-alkylation reaction, if desired, followed by esterification of the thus obtained 17-hydroxy-17α-alkyl compound.
Oxidation of the 17-hydroxyl group takes place in a known manner, for instance by the Oppenauer method or with chromium trioxide. The alkylation in 17-position can be performed by adding to the 17-keto-group of the relative compound a metal derivative of a saturated or unsaturated hydrocarbon. The metal derivative may be a Grignard compound, for example the magnesium bromide of the relative hydrocrabon or an alkyl lithium compound.
A special performance of the alkylation for the preparation of the 17-hydroxy-17-alkynyl compounds consists in that the 17-keto-steroid is reacted with a triple unsaturated hydrocarbon in the presence of an alkali metal or an alakali metal compound, such as an alkali metal amide or alcoholate, or by the addition of a metal compound of a triple unsaturated hydrocarbon, such as an alkali metal or alkaline earth metal compound, to the 17-keto group of the starting product.
The hydrocarbon radical possibly present in the final products in 17-position may be for example a methyl, ethyl, propyl, butyl, isopropyl, vinyl, propenyl, allyl, methallyl, ethinyl, propynyl, propargyl, or butynyl radical.

The secondary or tertiary 17-hydroxy-steroids prepared by the processes described above can be esterified, if desired. In the esterification inorganic acids, such as phosphoric acids, or saturated or unsaturated organic carboxylic acids with 1–18 carbon atoms, can be applied.

The preparation of these esters can take place by a method known per se by reaction of the 17-hydroxy-steroid with the relative acid or the anhydride or halide thereof.

As examples of organic carboxylic acids to be used in the esterification are mentioned: formic acid, acetic acid, propionic acid, butyric acid, valeric acid, capric acid, undecylic acid, lauric acid, tridecylic acid, myristic acid, pentadecylic acid, oleic acid, palmitic acid, stearic acid, arachic acid, behenic acid, lignoceric acid, cerotinic acid, mentanic acid, myricinic acid, trimethyl acetic acid, diethyl acetic acid, hexahydrobenzoic acid, cyclopentyl propionic acid, cyclohexyl butyric acid, cyclohexyl propionic acid, citronelic acid, undecylenic acid, erucic acid, benzoic acid, phenyl acetic acid, phenyl propionic acid, phenyl butyric acid, malonic acid, succinic acid, glutaric acid, pimelic acid and tartaric acid.

The compounds according to the invention have very valuable biological properties. They exert androgenic, anabolic, estrogenic, gonad-inhibiting and ovulation-inhibiting activities.

These compounds can be administered parenterally or orally in the form of suspensions, solutions, emulsions or solid pharmaceutical dosage unit forms, such as tablets, pills and coated tablets, usually after having been mixed with auxiliary substances, or, if desired, other active components.

The invention is illustrated further by the following examples:

Example I

Two grams of 7α - methyl - oestradiol - 3 - methylether, dissolved in 60 ml. of ether, are added to 60 ml. of liquid ammonia. At —60° C. 0.66 gm. of lithium is added.

After stirring for 30 minutes 20 ml. of absolute ethanol are gently added dropwise.

The ammonia is evaporated and the residue poured into water. After extraction with methylene dichloride, washing until neutral with water and drying over sodium sulphate the extract is evaporated to dryness in vacuo.

After crystallization from ether/hexane the 7α-methyl-3-methoxy-17β-hydroxy-$\Delta^{2,5(10)}$-oestradiene is obtained. $[\alpha]_D = +72.7(CHCl_3)$.

To 1 gm. of 7α - methyl - 3 - methoxy-17β-hydroxy-$\Delta^{2,5(10)}$-oestradiene in 100 ml. of methanol are added 1.17 gm. of oxalic acid in 200 ml. of distilled water.

After stirring for 2½ hours at 16° C. 250 ml. of distilled water are added.

The crystal mass is sucked off and washed until neutral to obtain the $\Delta^{5(10)}$-3-keto - 7α - methyl - 17β - hydroxy-oestrene.

Esterification of this compound yielded the 17-acetate, 17-caproate, 17-caprinate and the 17β-phenyl-propionate.

Example II

Twenty ml. of toluene are distilled off a solution of 10 gm. of 7α - methyl - 17β - hydroxy-3-methoxy-$\Delta^{2,5(10)}$-oestradiene, dissolved in 450 ml. of toluene. Next 85 ml. of cyclohexanone and 5 gm. of aluminium isopropylate are added.

After 2½ hours' distillation, when 50 ml. of solvent are distilled over, the reaction mixture is cooled, after which a solution of 90 gm. of Seignette salt in 90 ml. of water is added. After steam distillation the crystal mass is sucked off. After washing until neutral, drying and chromatography over silicagel the 7α-methyl-17-keto-3-methoxy-$\Delta^{2,5(10)}$-oestrardiene is obtained.

Acetylene is bubbled through a solution of 6 gm. potassium in 50 ml. of isopropanol and 90 ml. of benzene for 3 hours. Next a solution is added of 12 gm. of 7α - methyl - 17 - keto - 3 - methoxy-$\Delta^{2,5(10)}$-oestradiene in 60 ml. of tetrahydrofurane and 60 ml. of benzene, after which acetylene is bubbled through for another 3 hours at 0° C.

The reaction mixture is kept at room temperature for 1 night, after which 60 ml. of ice water are added at 0° C. in nitrogen atmosphere. The solvents are removed by steam distillation. The crude crystal mass is next sucked off, washed with water and dried. Next the residue is dissolved in 60 ml. of methanol after which 7 gm. of oxalic acid in 120 ml. of distilled water are added. After 2½ hours' stirring at 16° C. 300 ml. of water are added. After sucking off, washing and drying the crystal mass is chromatographed over silicagel to obtain the 7α-methyl-17α-ethynyl-17β-hydroxy-3-keto-$\Delta^{5(10)}$-oestrene.

By replacing the potassium acetylide by methyl magnesium bromide, propyl magnesium chloride or allyl magnesium bromide the corresponding 17α-methyl, 17α-propyl and 17α-allyl compounds are obtained.

Example III

To a solution of 2 gm. of 7α-methyl-17α-ethinyl-17β-hydroxy-3-keto-$\Delta^{5(10)}$-oestrene in 50 ml. of ethylacetate is added 0.4 gm. of pre-hydrated palladium on barium sulphate (5%) in 10 ml. of ethylacetate.

After the required hydrogen has been taken up the catalyst is filtered off and washed with ethylacetate. After evaporation in vacuo chromatography takes place over silicagel to obtain the 7α-methyl-17α-ethyl-17β-hydroxy-3-keto-$\Delta^{5(10)}$-oestrene.

Esterification of this compound yielded the 17-acetate, the 17-oenantate, the 17-laurate, the 17β-phenylpropionate and the 17-succinate.

If the hydrogenation is stopped after the half of the above quantity hydrogen has been taken up $\Delta^{5(10)}$-3-keto-7α-methyl-17β-hydroxy-17α-vinyl-oestrene is obtained.

Example IV

Five grams of $\Delta^{5(10)}$-3-keto-7α-methyl-17β-hydroxy-oestrene, prepared according to Example I, are dissolved in 165 ml. of acetone. This solution is cooled to 5° C., after which 6.5 ml. of a solution of 8 N chromic acid according to Jones are added while stirring. After stirring for 10 minutes the acetone is distilled off, water is added and the precipitate formed as filtered off, dried, crystallised from a mixture of methanol and water to yield $\Delta^{5(10)}$-3,17-diketo-7α-methyl-oestrene.

We claim:

1. Steroids of the formula:

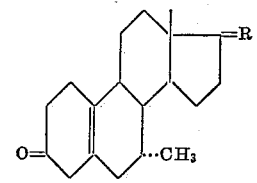

wherein R is selected from the group consisting of keto and the group OX (αY), wherein X is selected from the group consisting of hydrogen and acyl derived from an inorganic acid and an organic carboxylic acid containing 1 to 18 carbon atoms, and Y is selected from the group consisting of hydrogen and lower alkyl, alkenyl and alkynyl.

2. Steroids of the formula:

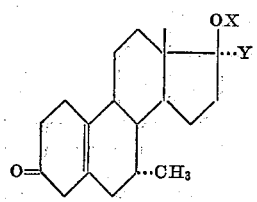

wherein X is selected from the group consisting of hydrogen and an organic carboxylic acid having 1–18 carbon atoms, and Y is selected from the group consisting of hydrogen and a saturated and unsaturated aliphatic hydrocarbon group having 1–4 carbon atoms.

3. $\Delta^{5(10)}$ - 3-keto-7$\alpha$-methyl-17$\beta$-hydroxy - 17$\alpha$-ethynylestrene.

References Cited

UNITED STATES PATENTS

| 2,725,389 | 11/1955 | Colton | 260—397.4 |
| 3,086,027 | 4/1963 | Perelman et al. | 260—397.3 |
| 3,262,949 | 7/1966 | Ringold et al. | 260—397.3 |

LEWIS GOTTS, *Primary Examiner.*

H. A. FRENCH, *Assistant Examiner.*

UNITED STATES PATENT OFFICE

CERTIFICATE OF CORRECTION

Patent No. 3,340,279 September 5, 1967

Hendrik Paul De Jongh et al.

It is hereby certified that error appears in the above numbered patent requiring correction and that the said Letters Patent should read as corrected below.

In the heading to the printed specification, line 9, for "64-6,797" read -- 6,406,797 --.

Signed and sealed this 29th day of October 1968.

(SEAL)
Attest:

Edward M. Fletcher, Jr.

Attesting Officer

EDWARD J. BRENNER

Commissioner of Patents